(12) United States Patent
Song et al.

(10) Patent No.: US 11,341,631 B2
(45) Date of Patent: May 24, 2022

(54) SYSTEM AND METHOD FOR AUTOMATICALLY DETECTING A PHYSIOLOGICAL CONDITION FROM A MEDICAL IMAGE OF A PATIENT

(71) Applicant: SHENZHEN KEYA MEDICAL TECHNOLOGY CORPORATION, Shenzhen (CN)

(72) Inventors: Qi Song, Seattle, WA (US); Shanhui Sun, Princeton, NJ (US); Feng Gao, Seattle, WA (US); Junjie Bai, Seattle, WA (US); Hanbo Chen, Seattle, WA (US); Youbing Yin, Kenmore, WA (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 138 days.

(21) Appl. No.: 16/028,389

(22) Filed: Jul. 5, 2018

(65) Prior Publication Data

US 2019/0050982 A1     Feb. 14, 2019

Related U.S. Application Data

(60) Provisional application No. 62/542,889, filed on Aug. 9, 2017.

(51) Int. Cl.
*G06T 7/00*     (2017.01)
*G06T 7/70*     (2017.01)
(Continued)

(52) U.S. Cl.
CPC .......... *G06T 7/0012* (2013.01); *G06K 9/6271* (2013.01); *G06T 7/70* (2017.01);
(Continued)

(58) Field of Classification Search
CPC ............. G06K 2209/05; G06K 9/4628; G06K 9/6271; G06T 2207/10081;
(Continued)

(56) References Cited

U.S. PATENT DOCUMENTS

2014/0235487 A1*   8/2014   McDevitt ............... G16B 40/00
                                                                                                             702/19
2016/0174902 A1*   6/2016   Georgescu ........... A61B 5/7267
                                                                                                             600/408
(Continued)

FOREIGN PATENT DOCUMENTS

CN          105740906 A       7/2016
CN          105760859 A       7/2016
(Continued)

OTHER PUBLICATIONS

Second Office action issued in related Chinese Application No. 201811155720.X, dated Aug. 12, 2020, 11 pages.
(Continued)

*Primary Examiner* — Charles N Appiah
*Assistant Examiner* — Nicole M Louis-Fils
(74) *Attorney, Agent, or Firm* — Bayes PLLC

(57) ABSTRACT

The present disclosure is directed to a method and system for automatically detecting a physiological condition from a medical image of a patient. The method may include receiving the medical image acquired by an imaging device. The method may further include detecting, by a processor, target objects and obtaining the corresponding target object patches from the received medical image. And the method may further include determining, by the processor, a first parameter using a first learning network for each target object patch. The first parameter represents the physiological condition level of the corresponding target object, and the first learning network is trained by adding one or more auxiliary classification layers. This method can quickly, accurately and automatically predict target object level and/or image (patient) level physiological condition from a medical image of a patient by means of a learning network, such as 3D learning network.

22 Claims, 9 Drawing Sheets

(51) Int. Cl.
  *G06K 9/62* (2022.01)
  *G06V 10/44* (2022.01)
(52) U.S. Cl.
  CPC .. *G06V 10/454* (2022.01); *G06T 2207/10081* (2013.01); *G06T 2207/10088* (2013.01); *G06T 2207/10108* (2013.01); *G06T 2207/20076* (2013.01); *G06T 2207/20081* (2013.01); *G06T 2207/20084* (2013.01); *G06T 2207/30064* (2013.01); *G06T 2207/30096* (2013.01); *G06V 2201/03* (2022.01)
(58) Field of Classification Search
  CPC . G06T 2207/10088; G06T 2207/10108; G06T 2207/20076; G06T 2207/20081; G06T 2207/20084; G06T 2207/30064; G06T 2207/30096; G06T 7/0012; G06T 7/70
  USPC .......................................................... 382/103
  See application file for complete search history.

(56) References Cited

U.S. PATENT DOCUMENTS

| | | | | |
|---|---|---|---|---|
| 2017/0200268 | A1* | 7/2017 | Podilchuk | G06K 9/6232 |
| 2017/0224270 | A1* | 8/2017 | Stamnes | G06K 9/4661 |
| 2018/0240233 | A1* | 8/2018 | Kiraly | G06T 7/0012 |
| 2019/0131016 | A1* | 5/2019 | Cohen | G16H 70/60 |
| 2019/0370972 | A1* | 12/2019 | Bagci | G06T 7/11 |
| 2020/0074634 | A1* | 3/2020 | Kecskemethy | A61B 5/1073 |
| 2020/0093455 | A1* | 3/2020 | Wang | G16H 50/70 |

FOREIGN PATENT DOCUMENTS

| | | |
|---|---|---|
| CN | 106575367 A | 4/2017 |
| CN | 106599869 A | 4/2017 |
| CN | 106780460 A | 5/2017 |
| CN | 106815566 A | 6/2017 |
| CN | 107280697 A | 10/2017 |
| CN | 108108657 A | 6/2018 |
| CN | 108154222 A | 6/2018 |

OTHER PUBLICATIONS

Dixiu Xue, "Research on Cancer Image Recognition based on Convolutional Neural Networks", Chinese Doctoral Dissertations Full-text Database, Feb. 15, 2018, pp. 1138-1188.

Tangquan Qi, "Research on the Key Technology of Deep Learning based Action Recognition and Tourism Scene Classification", Chinese Doctoral Dissertations Full-text Database, May 15, 2018, pp. 1138-20.

First Office action issued in related Chinese Application No. 201811156668.X, dated Mar. 20, 2020, 10 pages.

First Office action issued in related Chinese Application No. 201811155720.X, dated Apr. 1, 2020, 11 pages.

* cited by examiner

SYSTEM AND METHOD FOR AUTOMATICALLY DETECTING A PHYSIOLOGICAL CONDITION FROM A MEDICAL IMAGE OF A PATIENT

CROSS-REFERENCE TO RELATED APPLICATION

This application claims the benefit of priority to U.S. Provisional Application No. 62/542,889, filed on Aug. 9, 2017, the entire contents of which are incorporated herein by reference.

TECHNICAL FIELD

The disclosure generally relates to image processing and analysis. More specifically, this disclosure relates to method and system for automatically detecting a physiological condition from a medical image of a patient.

BACKGROUND

In the United States lung cancer strikes about 225,000 people every year. Early cancer detection is crucial for patients' survival. In a clinical setup, experienced medical personnel such as radiologists usually perform lung cancer screening using low dose CT scan, with each scan containing about hundreds of 2D images for one single patient. Although some machine learning methods are introduced for assisting the radiologists in detecting and locating the lung nodule, however, usually the radiologists have to analyze the nodules' shape, texture, solidarity, lobulation, surrounding tissue etc., for all the 2D images contained in the low dose CT scan to determine whether the lung nodules are malignant or benign, which makes it tedious, time consuming and error prone. Thus pathology analysis via biopsy diagnosis is often required to confirm the determination result.

The accuracy of diagnosis and outcome of treatment for lung cancer depend on the quality of malignancy level prediction of the lung nodule. For other diseases, such as prostate cancer, stroke, coronary artery disease, etc., the accuracy of diagnosis and outcome of treatment depend on the quality of medical image analysis, especially associated physiological condition prediction of the corresponding target object. Particularly, the target object includes organ, tissue, target site, etc., and the physiological condition includes malignant or benign, vascular sclerosis or healthy vessel, cerebral hemorrhage, etc.

This disclosure provides a system that can quickly, accurately, and automatically predicting target object level and/or image (patient) level physiological condition from a medical image of a patient by means of learning network, such as 3D learning network. The learning network for predicting the target object level physiological condition may be reutilized for the learning network for predicting the image level physiological condition.

SUMMARY

In one aspect, the present disclosure is directed to a computer-implemented method for automatically detecting a physiological condition from a medical image of a patient. The method may include receiving the medical image acquired by an imaging device. The method may further include detecting, by a processor, target objects and obtaining the corresponding target object patches from the received medical image. And the method may further include determining, by the processor, a first parameter using a first learning network for each target object patch. The first parameter represents the physiological condition level of the corresponding target object, and the first learning network is trained by adding one or more auxiliary classification layers.

In another aspect, the present disclosure is directed to a system for automatically detecting a physiological condition from a medical image of a patient. The system may include an interface configured to receive the medical image acquired by an imaging device. The system may further include a processor that is configured to detect the target objects and obtaining the corresponding target object patches from the received medical image. The processor may be further configured to determine a first parameter using a first learning network for each target object patch. The first parameter represents the physiological condition level of the corresponding target object, and the first learning network is trained by adding one or more auxiliary classification layers.

In another aspect, the present disclosure is also directed to a non-transitory computer readable medium having instructions stored thereon. The instructions, when executed by a processor, may perform the following steps. The steps may include receiving the medical image acquired by an imaging device. The steps may further include detecting the target objects and obtaining the corresponding target object patches from the received medical image. The steps may further include determining a first parameter using a first learning network for each target object patch. The first parameter represents the physiological condition level of the corresponding target object, and the first learning network is trained by adding one or more auxiliary classification layers.

In yet another aspect, the present disclosure is directed to a system for automatically detecting a physiological condition from a medical image of a patient. The system may include an interface configured to receive the medical image acquired by an imaging device. The system may further include a processor that is configured to detect the target objects and obtaining the corresponding target object patches from the received medical image. The processor may be further configured to determine a first parameter using a first learning network for each target object patch. The first parameter represents the physiological condition level of the corresponding target object, and the first learning network is trained by adding one or more auxiliary classification layers. Besides, the processor may be further configured to determine a second parameter using a trained second learning network on the basis of multiple target object patches from the medical image. The second parameter represents physiological condition level of the patient, and the second learning network is configured to perform multiple-instance learning by reutilizing the trained first learning network for each of the multiple target object patches so as to extract respect target object features as instance features.

In yet another aspect, the present disclosure is also directed to a non-transitory computer readable medium having instructions stored thereon. The instructions, when executed by a processor, may perform the following steps. The steps may include receiving the medical image acquired by an imaging device. The steps may further include detecting the target objects and obtaining the corresponding target object patches from the received medical image. The steps may further include determining a first parameter using a first learning network for each target object patch. The first parameter represents the physiological condition level of the corresponding target object, and the first learning network is trained by adding one or more auxiliary classification layers. Besides, the steps may also include determining a second parameter using a trained second learning network on the basis of multiple target object patches from the medical image. The second parameter represents physiological condition level of the patient, and the second learning network is configured to perform multiple-instance learning by reutilizing the trained first learning network for each of the multiple target object patches so as to extract respect target object features as instance features.

It is to be understood that the foregoing general description and the following detailed description are exemplary and explanatory only, and are not restrictive of the invention, as claimed.

BRIEF DESCRIPTION OF THE DRAWINGS

In the drawings, which are not necessarily drawn to scale, like numerals may describe similar components in different views. Like numerals having letter suffixes or different letter suffixes may represent different instances of similar components. The drawings illustrate generally, by way of example, but not by way of limitation, various embodiments, and together with the description and claims, serve to explain the disclosed embodiments. When appropriate, the same reference numbers are used throughout the drawings to refer to the same or like parts. Such embodiments are demonstrative and not intended to be exhaustive or exclusive embodiments of the present method, system, or non-transitory computer readable medium having instructions thereon for implementing the method.

DETAILED DESCRIPTION

The term "target object" used herein may refer to any anatomical structure in the subject body, such as a tissue, a part of an organ, or a target site. For example, a target object may be a lung nodule. The term "physiological condition" used herein may refer to any disease condition and/or healthy condition of the patient or his/her "target object", such as the lung nodule is malignant or benign, the vessel is healthy or has a thrombus therein, the patient has a cerebral hemorrhage, etc. The term "physiological condition level" used herein may refer to a probability that the patient/target object will develop or has developed such physiological condition, or the developing extent of such physiological condition (for example, cancer stage), etc. Besides, the term "learning network" used herein may refer to a network model implemented by various machine learning approaches.

Figure 1:
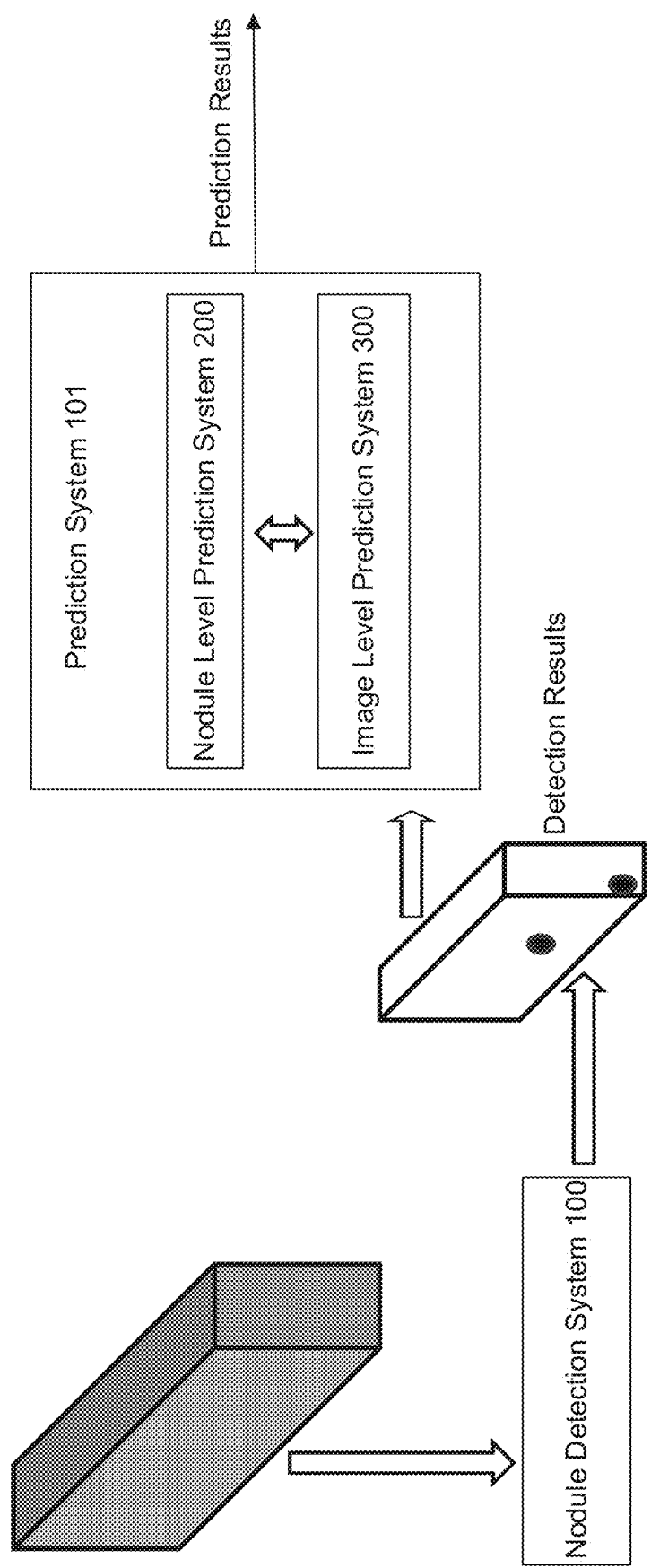
FIG. 1 illustrates an exemplary prediction system according to an embodiment of present disclosure.

FIG. 1 illustrates an exemplary prediction system 101 for automatically predicting physiological condition from a medical image of a patient according to an embodiment of present disclosure. In this embodiment, the target object is a lung nodule. A lung nodule may become a target site for a treatment such as radiotherapy treatment. Lung volumetric CT images may be obtained by a chest CT scan and then input into a nodule detection system 100. The nodule detection system 100 is configured to detect and locate the lung nodules in the volumetric CT images, and it may output nodule patches (with nodule existing therein) as detection results. Several examples of such nodule detection system 100 have already been provided in U.S. application Ser. No. 15/996,434, filed on Jun. 2, 2018, the entire contents of which are incorporated herein by reference. Besides, other nodule detection system 100 may also be adopted herein.

The prediction system 101 obtains the nodule patches from the nodule detection system 100, predicts the malignancy level (such as malignancy probability or malignancy score) of each lung nodule and/or a probability that the patient will develop or has developed a lung cancer as prediction results and outputs the same. As shown in FIG. 1, the prediction system 101 may include: an interface (not shown) configured to receive the nodule patches from the nodule detection system 100; a nodule level prediction system 200 and/or an image level prediction system 300. The nodule level prediction system 200 may be configured to determine a first parameter using a trained first 3D learning network for each nodule patch, wherein the first parameter represents the malignancy level of the nodule in the corresponding nodule patch. For example, the first parameter may be malignancy probability, malignancy score, etc. The image level prediction system 300 may be configured to determine a second parameter on the basis of multiple nodule patches from the medical image by a trained second learning network which is configured to reutilize the trained first 3D learning network, wherein the second parameter represents the cancer prediction result of the patient (image level cancer prediction result). For example, the second parameter may be the probability that the patient will develop or has developed a lung cancer, a cancer decision value indicating whether the patient has developed a lung cancer, etc. The expression "a second learning network which is configured to reutilize the trained first 3D learning network" used herein means that the trained first learning network (e.g. weights of at least part of the trained first learning network) and/or the information (intermediate information or the first parameter) obtained by applying the trained first learning network to each of the multiple nodule patches is reutilized in the image level cancer prediction pipeline of the trained second learning network. The prediction system 101 may provide two kinds of prediction results: malignancy level of each individual lung nodule; and the cancer prediction result of the patient (image level cancer prediction result). The cancer prediction result of the patient guides radiologists towards making a correct cancer decision. Besides, the nodule-level malignancy level provides detailed medical information, which assist the radiologists in confirming (double-check) the cancer decision and drafting the medical diagnosis reports.

In some embodiments, each of the first learning network and the second learning network may be implemented by various machine learning approaches. For example, in a case that the medical image is a 2D image, the learning network may be a 2D learning network; while in a case that the medical image is a 3D image, the learning network may be a 3D learning network. The 3D convolution neural network structures illustrated in the figures are only examples of the learning network, and the learning network may adopt 3D convolution neural network of other structures, and may also adopt other neural networks.

Figure 2:
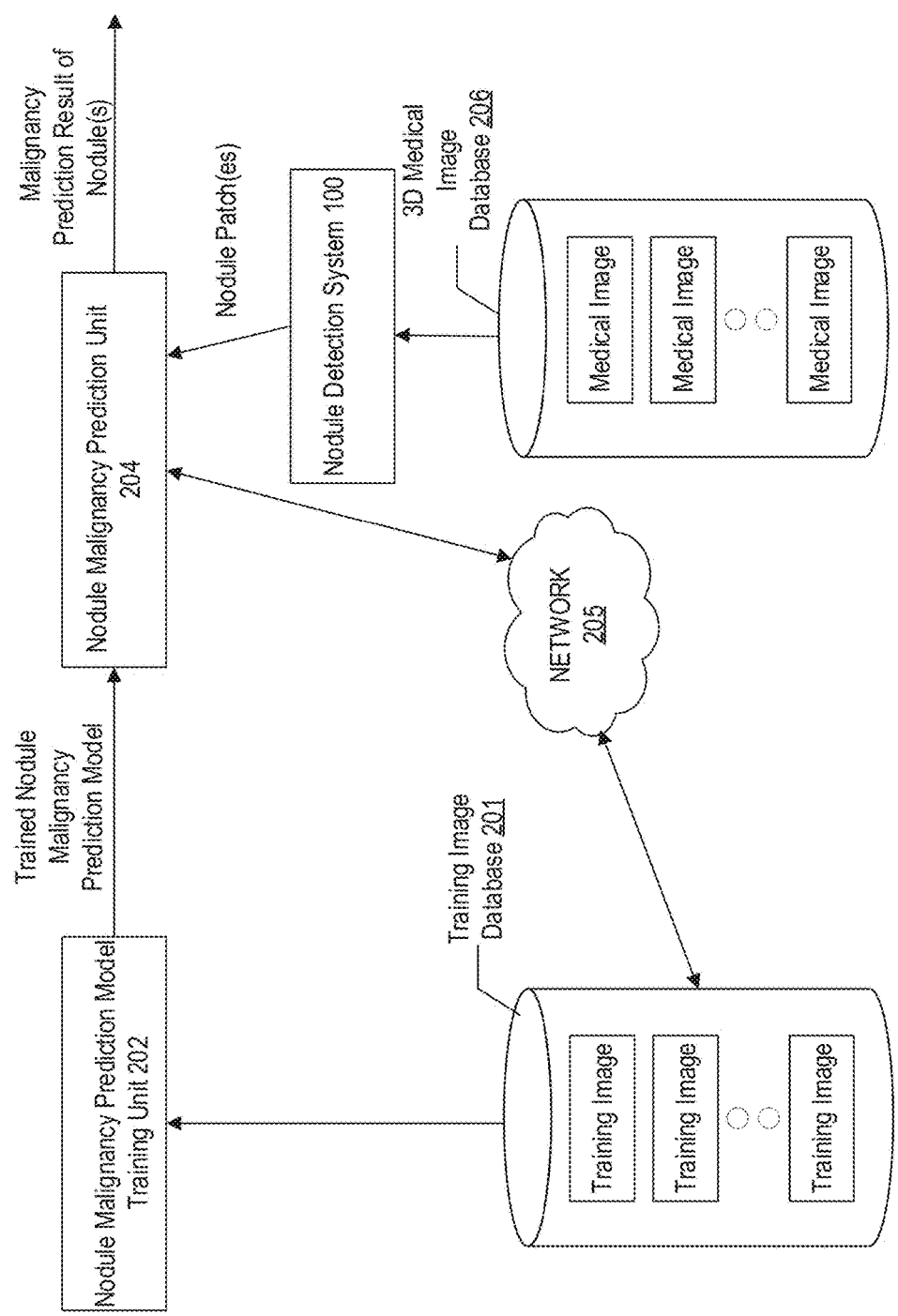
FIG. 2 illustrates an exemplary nodule level prediction system according to an embodiment of present disclosure.

As shown in FIG. 2, the nodule level prediction system 200 includes: a nodule malignancy prediction model training unit 202 for training a nodule malignancy prediction model; and a nodule malignancy prediction unit 204 for predicting the malignancy level of individual nodules using the trained nodule malignancy prediction model. For example, the nodule malignancy prediction model may be implemented by a first 3D learning network. The trained nodule malignancy prediction model may be transmitted from the nodule malignancy prediction model training unit 202 to the nodule malignancy prediction unit 204 so that the nodule malignancy prediction unit 204 may apply it to each 3D nodule patch received from the nodule detection system 100. The nodule detection system 100 acquires 3D medical images from 3D medical image database 206, detects the nodules therefrom, and outputting the 3D lung nodule patches.

For example, the malignancy prediction result of an individual nodule may be represented as a malignancy score from 1 to n (wherein n is a natural number). Thus the trained nodule malignancy prediction model may be formulated as a classification network with n output nodes in the last layer.

The training samples may be stored in a training image database 201, and may be acquired by the nodule malignancy prediction model training unit 202 to train the nodule malignancy prediction model. Each training sample may include a nodule patch and the malignancy score of the nodule therein.

In some embodiments, the malignancy prediction result of individual nodule may be visualized using heat-map overlaid with the original medical 3D image, e.g. the original volumetric CT image. In some embodiments, the malignancy prediction result may be transmitted to the training image database 201 through network 205, and added together with the corresponding nodule patch as an additional training sample. In this manner, the training image database 201 may be updated continuously by including new malignancy prediction results. In some embodiments, the nodule malignancy prediction model training unit 202 may train the nodule malignancy prediction model with the updated training samples periodically, to improve the prediction accuracy.

Figure 3:
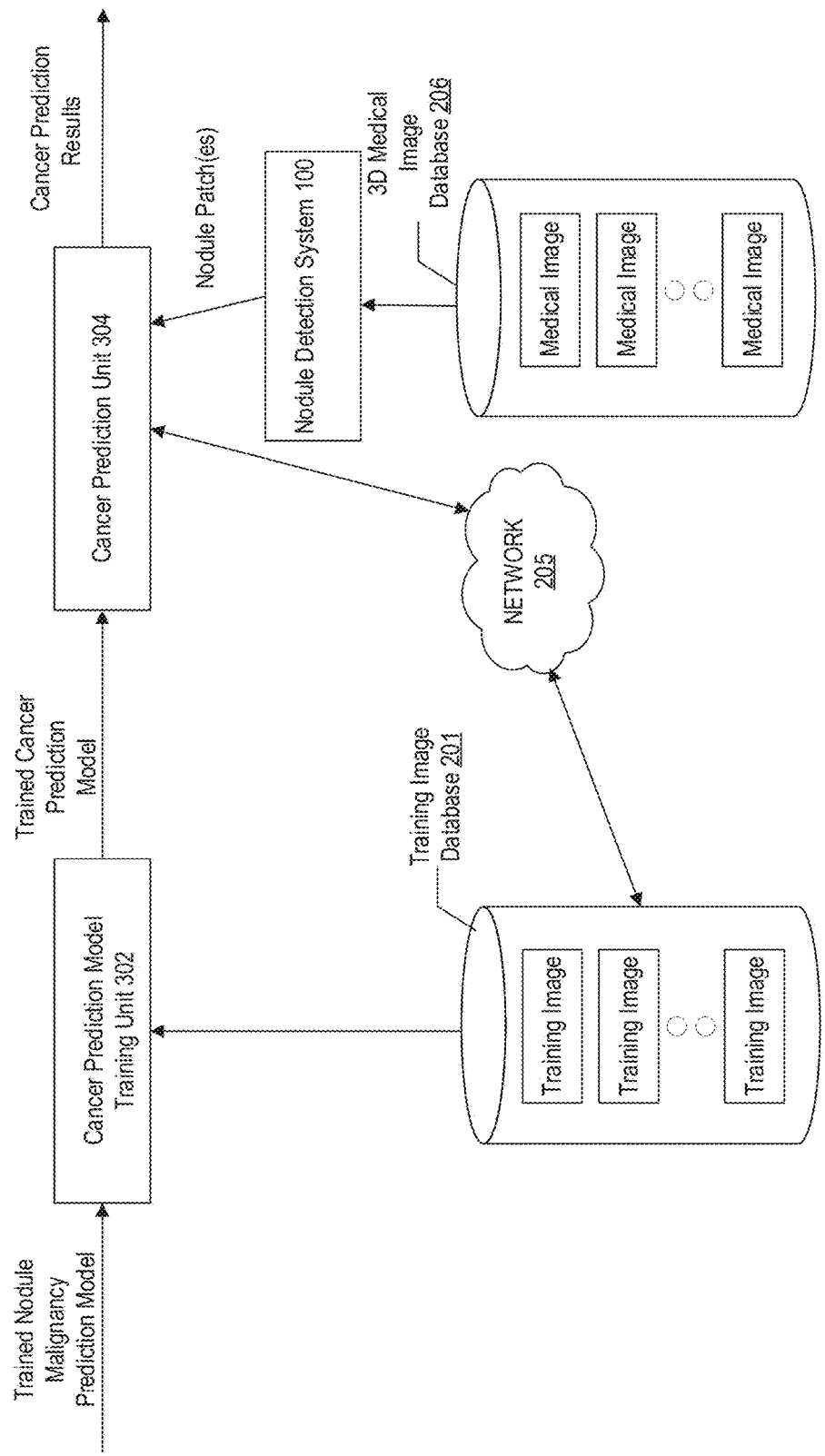
FIG. 3 illustrates an exemplary image level prediction system according to an embodiment of present disclosure.

FIG. 3 illustrates an exemplary image level prediction system 300 according to an embodiment of present disclosure. As shown in FIG. 3, the image level prediction system 300 includes: a cancer prediction model training unit 302 for training a cancer prediction model; and a cancer prediction unit 304 for predicting whether the patient will develop a lung cancer or has developed a lung cancer using the trained cancer prediction model. For example, the cancer prediction model may be implemented by a second 3D learning network. In some embodiment, the second 3D learning network may reutilize the above first 3D learning network. For example, the second 3D learning network may reutilize the above first 3D learning network for feature extraction. For another example, the second 3D learning network may aggregate and/or pool the first parameters determined by applying the trained first 3D learning network to the multiple nodule patches, so as to determine the second parameter. In some embodiment, the first 3D learning network may obtain a malignancy score for each nodule in the medical image, and the second 3D learning network may obtain the largest malignancy score out of the malignancy scores of all the nodules detected from the medical image, and use the same to perform cancer prediction for the patient. In some embodiment, the second 3D learning network may be configured to perform multiple-instance learning. Each nodule is an instance and the multiple nodules from the same scan form an instance bag. The bag feature is obtained on the basis of the features of the multiple nodules.

The trained cancer prediction model may be transmitted from the cancer prediction model training unit 302 to the cancer prediction unit 304 so that the cancer prediction unit 304 may apply it to the multiple nodule patches received from the nodule detection system 100.

The training samples may be stored in a training image database 201, and may be acquired by the cancer prediction model training unit 302 to train the cancer prediction model. Each training sample may include a set of nodule patches (the multiple nodule patches) and the cancer prediction result (such as whether the patient will develop or has developed a lung cancer, the probability that the patient will develop or has developed a lung cancer, etc.). Patient (image) level labels are available for a great amount of data, thus facilitate the training of the cancer prediction model.

Figure 4:
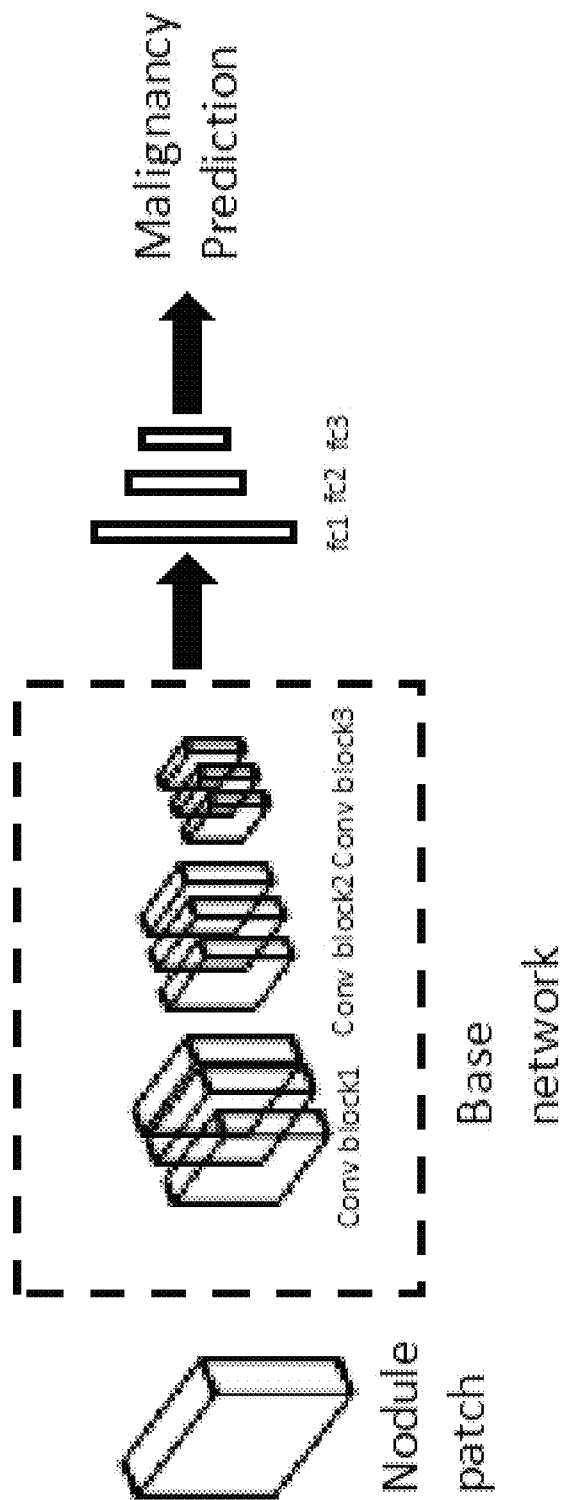
FIG. 4 illustrates a schematic illustration of the 3D learning network for nodule level prediction, according to an embodiment of present disclosure.

In one embodiment, the first learning network used for the nodule malignancy prediction model may be a 3D convolutional neural network, as shown in FIG. 4. For example, the 3D convolutional neural network may include three convolution blocks and three malignancy classification layers fc1, fc2, and fc3. In some embodiments, fc1, fc2, and fc3 may be fully connected layers used for classification tasks, and fc3 may have a number of neurons depending on the classification task. For example, if the nodule malignancy level is represented as a malignancy score from 1 to 10, then the number of neurons in fc3 layer is 10, and each output node produces the probability for corresponding malignancy score.

Figure 5:
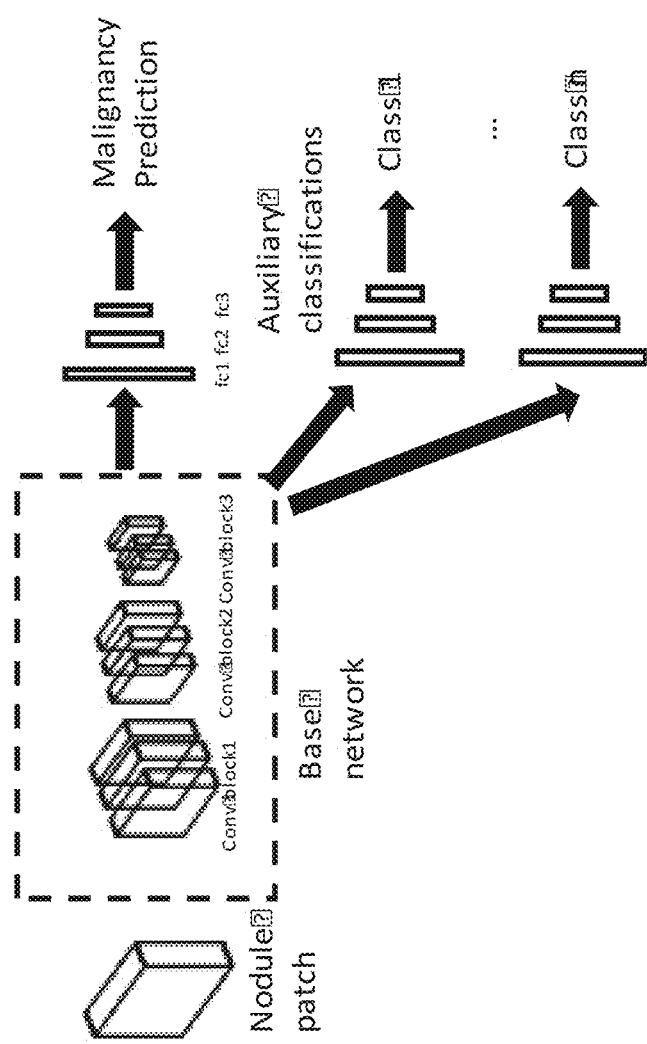
FIG. 5 illustrates a schematic illustration of the training scheme of the 3D learning network for nodule level prediction, according to an embodiment of present disclosure.

FIG. 5 illustrates a schematic illustration of the training scheme of the 3D learning network (the first learning network) for nodule level prediction, according to an embodiment of present disclosure. As shown in FIG. 5, one or more auxiliary classification layers are added to perform the training of the first learning network. Particularly, the one or more auxiliary classification layers are added in the training stage so as to perform multi-task (both malignancy classification task and auxiliary classification task) training, and the corresponding trained multi-pass learning network includes malignancy pass and auxiliary classification pass(es). Then the auxiliary classification pass(es) may be removed and the malignancy pass is maintained to obtain the trained first learning network (i.e., the nodule malignancy prediction model). In this training scheme, tasks regulate each other in the training procedure, so that the over-fitting problem may be efficiently avoided.

Figure 6:
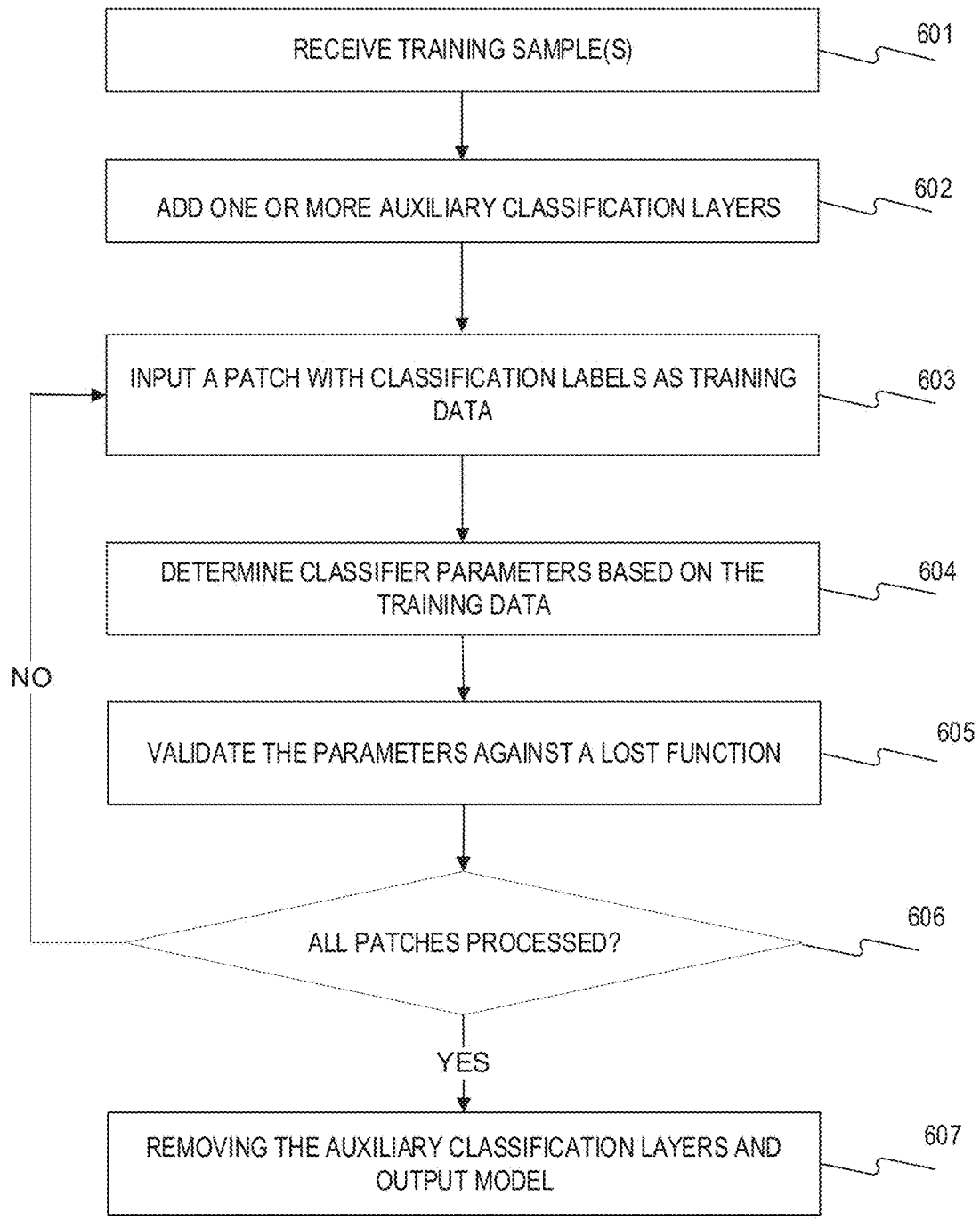
FIG. 6 illustrates a flow chart of an exemplary process for training the 3D learning network for nodule level prediction, according to an embodiment of present disclosure.

FIG. 6 illustrates a flow chart of an exemplary process 600 for training the 3D learning network for nodule level prediction, according to an embodiment of present disclosure. The process starts at step 601 of receiving a training sample. The training sample may adopt various forms. For example, the training sample may be a patch training sample, which is comprised of a 3D nodule patch and the classification labels (e.g. the malignancy label and auxiliary classification labels) for the nodule therein. For another example, the training sample may be comprised of a 3D training image and the classification labels (e.g. the malignancy labels and auxiliary classification results) for individual nodules therein. Under this condition, the process may include a step (not shown) of detecting nodule patches from the 3D training image and obtaining the patch training samples, each of which is comprised of a nodule patch and the corresponding classification labels for the nodule therein.

Then, at step 602, one or more auxiliary classification layers are added, so as to regulate the malignancy classification task and aid the training of the malignancy prediction network. At step 603, a single patch together with the corresponding classification labels thereof are input into the 3D learning network as training data. In some embodiments, the weights of the 3D learning network may have been initialized. At step 604, the parameters of the 3D learning network may be determined based on the training data. The determination of network parameters may involve validating against a lost function, at step 605. In some embodiments, steps 604 and 605 may also be integrated in the same step, wherein the network parameters may be optimized against a lost function on the basis of each patch. In some embodiments, the optimization process may be performed by any one of the common algorithms, including but not limited to the gradient descent algorithm, Newton's method, conjugate gradient algorithm, quasi Newton method, and Levenberg Marquardt algorithm, etc. In some embodiment, cross entropy may be adopted as a loss function. For example, the lost function used at step 605 may be:

$$L(p) = \frac{1}{N_{cls}} \sum_i L_{cls}(p_i, p_i^*) + \lambda \frac{1}{N_{cls}} \sum_i \sum_j L_{cls}^j(p_i, p_i^*), \quad (1)$$

where i is the index of image patch in a training mini-batch and $p_i$ is the predicted probability of patch i being malignancy nodule or being corresponding label, j is the index of auxiliary classification task. $p_i^*$ is the ground-truth label, $L_{cls}$ is cross-entropy loss, $N_{cls}$ is the number of image patches in the mini-batch and is used for normalization, $\lambda$ is a weighting parameter between malignancy classification task and auxiliary classification tasks. In some embodiment, at least one of the classification tasks (layers) for texture, size, solidarity, lobulation, and speculation, etc., may be adopted as auxiliary classification tasks (layers).

At step 606, it determines whether all patches are already processed, if so, then at step 607, the auxiliary classification layers may be removed from the trained classification network with present optimized classifier parameters, and the remained malignancy pass is output as the trained model. Otherwise, the process returns to step 603 to process a subsequent patch, until all the patches are processed.

In some embodiment, the malignancy prediction results of multiple nodules in a medical image may be firstly obtained by applying trained learning network for nodule level prediction to multiple nodule patches and then aggregated and/or pooled so as to obtain the cancer prediction result of the patient (image/patient level prediction), including but not limit to if the patient will develop lung cancer or has developed a lung cancer. The training of the learning network requires nodule level labels.

In some embodiment, the second 3D learning network for image level prediction may be provided, so as to incorporate image level labels which are available for a great amount of data for training. A substantial cost for the medical image machine learning task is spent on annotating the data, usually radiologist may only label the whole scan with one label as either cancer patient or non-cancer patient, and training samples are easy to obtain for the second 3D learning network, which efficiently reduces the training cost. The second 3D learning network is configured to perform multiple-instance-learning, as shown in FIG. 7, wherein each nodule is an instance and n nodule patches from the same scan form an instance bag, features of respect nodules is pooled to obtain a bag feature, which is then fed into the classifier, so as to predict a bag label as the image level label.

Figure 7:
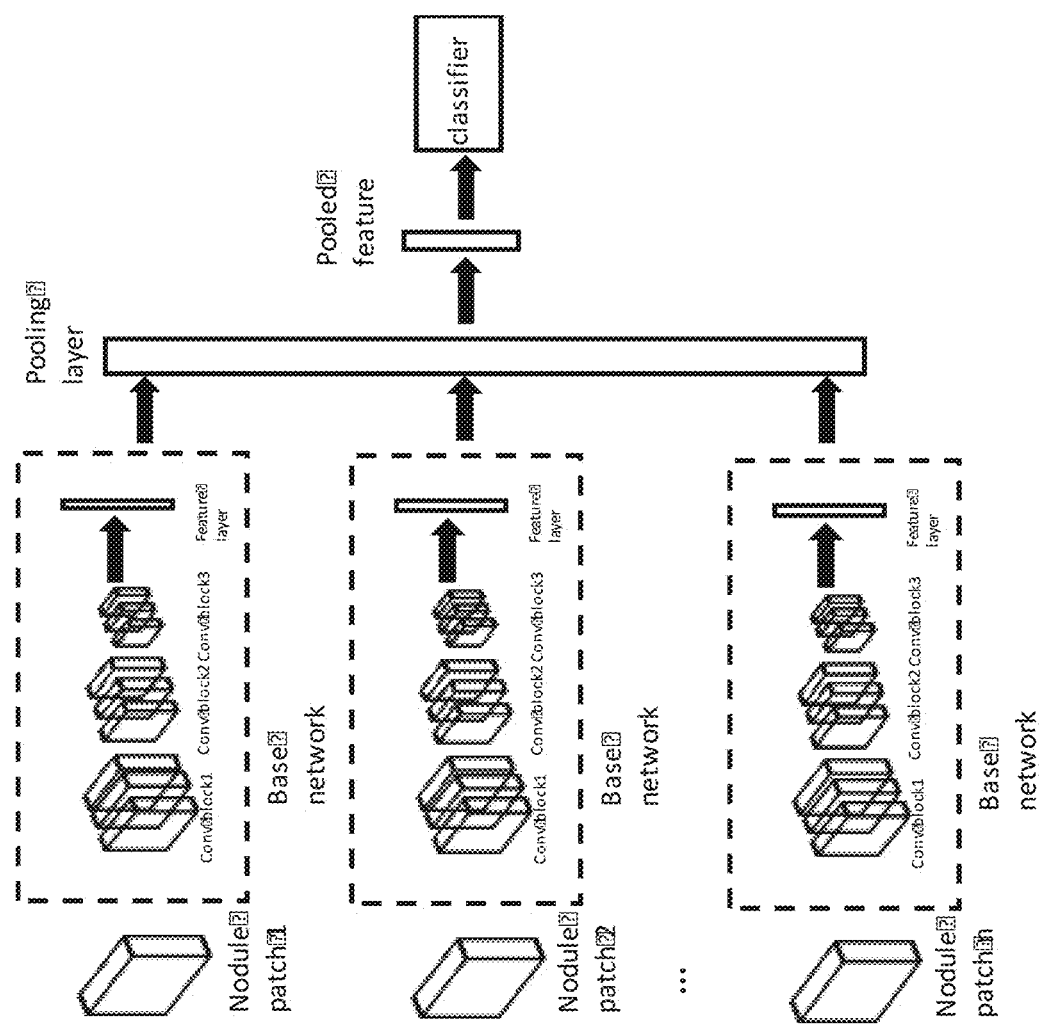
FIG. 7 illustrates a schematic illustration of the 3D learning network for image level prediction, according to an embodiment of present disclosure.
Figure 8:
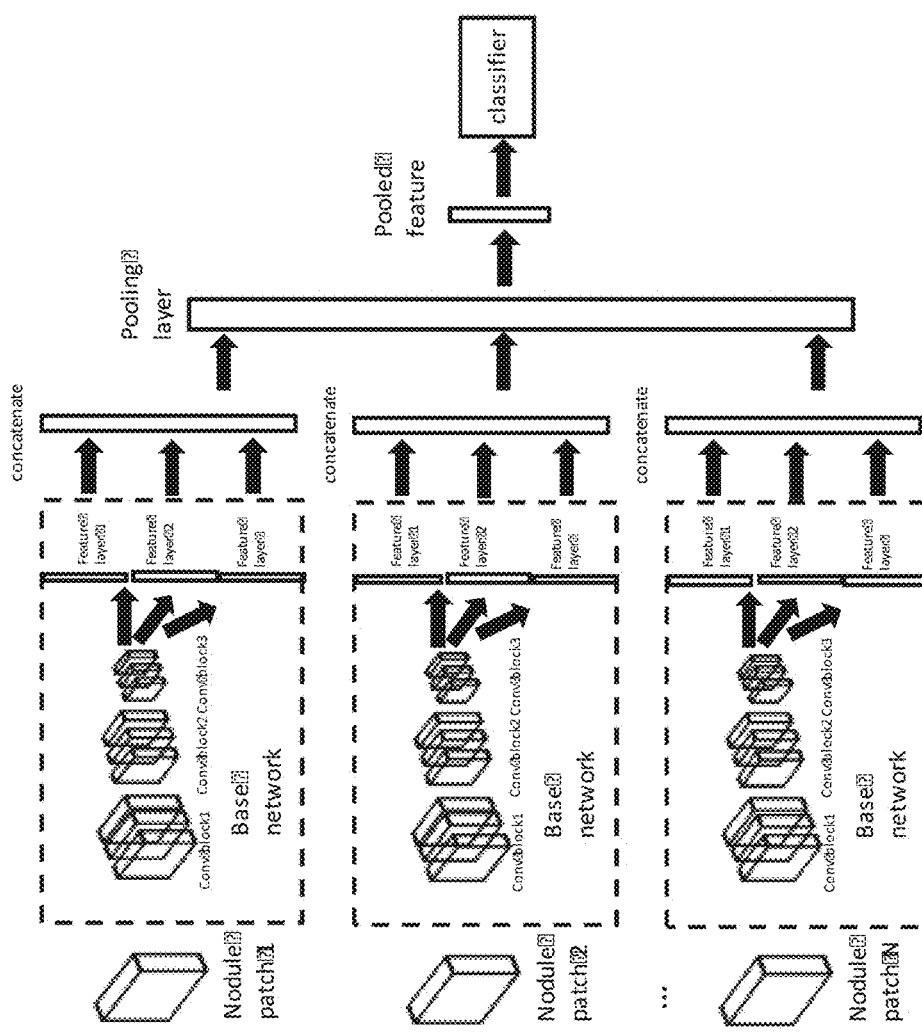
FIG. 8 illustrates a schematic illustration of the 3D learning network for image level prediction, according to another embodiment of present disclosure.

Particularly, n nodule patches may be obtained from the 3D medical image by using the nodule detection system 100, the feature of each nodule may be extracted by utilizing the trained first learning network as shown in FIG. 4 (see FIG. 7) or the trained learning network with auxiliary classification layers as shown in FIG. 5 (see FIG. 8). The reutilizing of the trained learning network for nodule malignancy prediction facilitates the training and constructing of the second learning network.

In some embodiment, as shown in FIG. 7, each nodule patch (1~n) is input into the trained first learning network. The trained first learning network may adopt different structures, for example, it may include three convolution blocks and several malignancy classification layers, and the output from one of the malignancy classification layers is used as the nodule feature. The malignancy classification layers of the trained first learning network used for nodule feature extraction are represented as "feature layer", as shown in FIG. 7. Then, nodule features of the n nodule patches are pooled by the pooling layer into a lower dimension (e.g. the same dimension as that of the single nodule feature), and the pooled feature is then fed into a classifier to produce the final decision (whether the patient has developed a lung cancer and/or whether the patient will develop a lung cancer). In one embodiment, fully connected layers may be used as the malignancy classification layers, and the output from fc1 layer, which is the first fully connected layer after the convolution layers, is used as the nodule feature. In some embodiment, the n nodule patches may be the top n nodules determined based on nodule detection confidence by using a threshold. In some embodiment, the pooling can be any one of average, max pooling and bag of feature word pooling.

In some embodiment, the classifier can be any one of gradient boosting machines (such as XGBoost and LightGBM) classifier, random forest classifier, multiple layer perceptron (neural network) or any classifier could produce posterior probability. In some embodiment, diverse linear/non-linear machine learning approaches are combined to get a boosted result.

In some embodiment, the bag of feature word pooling may be carried out by the following steps. Firstly, a plurality of nodule features are collected in the training stage, then are grouped into M clusters using K-means algorithm. Cluster centers are saved for the pooling stage. In the pooling stage, k-nearest neighbors of the collected nodule features to the saved cluster centers are identified. In one embodiment, KD-Tree is utilized to identify the k-nearest neighbors, so as to accelerate the identifying process. Thus nodule features are projected to cluster centers using k-nearest neighbors algorithm, an M-bin histogram is formed by the top n nodules in the same scan. In one embodiment, the histogram is weighted based on feature's distance to each cluster center. In another embodiment, sparse coding approach may be used instead of the k-nearest neighbor approach.

In some embodiment, as shown in FIG. 8, for each of the n nodule patches, the trained learning network with auxiliary classification layers may be utilized to extracted features. The trained learning network with auxiliary classification layers may adopt different structures, for example, it may include three convolution blocks and several malignancy classification layers and auxiliary classification layers, and the outputs from one or more of the malignancy classification layers and auxiliary classification layers may be used as the nodule features. The malignancy classification layers and auxiliary classification layers of the trained first learning network used for nodule feature extraction is represented as "feature layer", as shown in FIG. 8.

As a contrast to obtaining a single feature for each nodule patch as shown in FIG. 7, in FIG. 8, several features are obtained for each nodule patch, including but not limited to malignancy, texture, nodule size, lobulation, speculation, solidarity, etc. For each nodule patch, all these features are then combined (e.g. concatenated) into one feature vector, and then fed to the pooling layer. The pooling and classification operation are the same as the method using single nodule feature for each nodule patch as shown in FIG. 7, and thus are omitted here for avoid redundancy. In this manner, multi-task features are incorporated into a nodule composite feature vector so as to boost the image level cancer prediction.

In some embodiment, the classifier in FIG. 7 and FIG. 8 may be set as multiple layer perceptron. In addition, the number n of the nodule patches (i.e., the instance number) is fixed. For example, top n nodules may be determined based on the confidence level of nodule detection. If the number of nodule patches detected from the image is not sufficient (namely smaller than n), lung tissue patches may be randomly sampled from the same image as nodule patches, so as to produce n patches. In some embodiment, each pass of the trained learning network used for feature extraction may share the same weights, and the initial weights may be are copied from the trained first learning network as shown in FIG. 4 or FIG. 5. Particularly, the first learning network for nodule level prediction may be trained firstly and the weights of the trained first learning network for nodule level prediction may be used as initial weights of the feature extraction learning network of each pass in the second learning network for image level prediction, so as to facilitate and accelerate the training of the second learning network. Cross-entropy loss function may be adopted in the training stage. The second learning network performs multiple instance learning and make sufficient use of the available training samples, each sample is comprised of n nodule patches in the same image and the image level label, so that the feature layers may also be adapted to more training samples and the prediction accuracy of the second learning network for image level prediction may be improved continuously. The second learning network is trained in an end-to-end manner, so that the training is easy to understood and operated by the users such as the radiologists who are not familiar with machine learning approaches, especially the parameters with abstract meaning in this field, for example, the feature vectors, network weights, etc.

In some embodiment, one or more patient information associated with the physiological condition may be used as additional none-image features to combine with the image features such as the malignancy features and various auxiliary features and as above, so as to obtain the feature vector to feed to the image level classifier. For example, for lung cancer, the patient information may include patient's smoking history, age, gender, etc. In this manner, the learning network may consider the patient's comprehensive characteristic information (both none-image and image features) for image level prediction and thus improve the prediction accuracy. The additional none-image features may be combined with the image features in various manners. For example, the additional non-image features may be concatenated with the pooled image feature of the image into one feature vector. In some embodiment, for the classifiers that are sensitive to the scales of features, such as multiple-layer perceptron, the features may be normalized to have a mean of 0 and standard deviation of 1.

In the above embodiments, lung nodule is used as an example of the target object while malignancy and cancer are used as examples of the physiological conditions; however, the present disclosure is not limited thereto. Instead, the above embodiments may be varied by replacing the lung nodule with other target object while replacing malignancy and cancer with other corresponding physiological conditions. For example, a variation of the above embodiments may be provided by using vessel section as the target object and the extent of vessel stenosis as the physiological condition.

Figure 9:
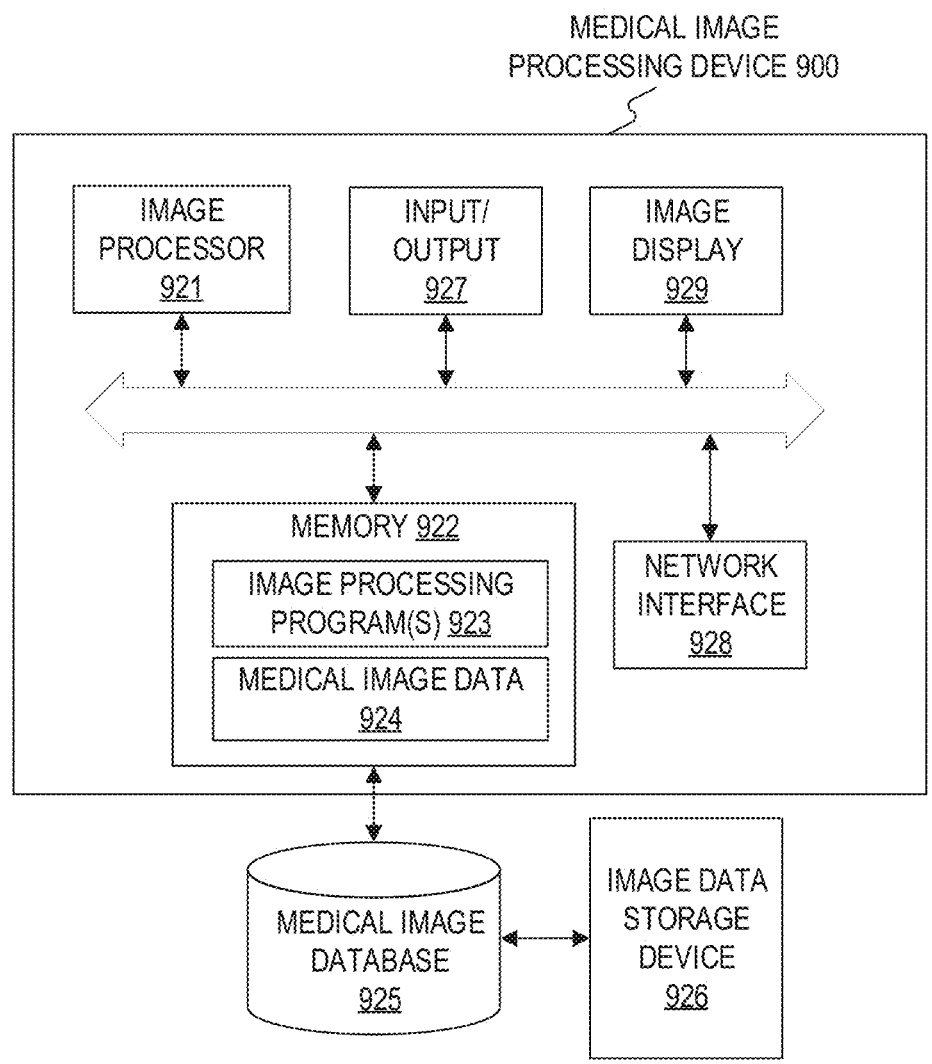
FIG. 9 depicts a block diagram illustrating an exemplary medical image processing device, according to an embodiment of present disclosure.

FIG. 9 depicts a block diagram illustrating an exemplary medical image processing device 900 adapted for automatically predicting physiological condition from a medical image of a patient according to an embodiment of present disclosure. The medical image processing device 900 may include a network interface 928, by means of which the medical image processing device 900 may be connected to the network (not shown), such as but not limited to the local area network in the hospital or the Internet. The network can connect the medical image processing device 900 with external devices such as an image acquisition device (not shown), medical image database 925, and an image data storage device 926. An image acquisition device may be any device that acquires images of an object, e.g. a DSA imaging device, an MRI imaging device, a CT image device, a PET imaging device, an ultrasound device, a fluoroscopic device, a SPECT imaging device, or other medical imaging device for obtaining medical images of the patient. For example, the medical imaging device may be a pulmonary CT imaging device, etc.

In some embodiments, the medical image processing device 900 may be a dedicated intelligent device or a general purpose intelligent device. For example, the device 900 may be a computer customized for image data acquisition and image data processing tasks, or a server placed in the cloud. For example, the device 900 may be integrated into the image acquisition device. Optionally, the device may include or cooperate with a 3D re-constructing unit for re-constructing the 3D image on the basis of the 2D images acquired by the image acquisition device.

The medical image processing device 900 may include an image processor 921 and a memory 922, and may additionally include at least one of an input/output 927 and an image display 929.

The image processor 921 may be a processing device that includes one or more general processing devices, such as a microprocessor, a central processing unit (CPU), a graphics processing unit (GPU), and the like. More specifically, the image processor 921 may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The image processor 921 may also be one or more dedicated processing devices such as application specific integrated circuits (ASICs), field programmable gate arrays (FPGAs), digital signal processors (DSPs), system-on-chip (SoCs), and the like. As would be appreciated by those skilled in the art, in some embodiments, the image processor 921 may be a special-purpose processor, rather than a general-purpose processor. The image processor 921 may include one or more known processing devices, such as a microprocessor from the Pentium™, Core™, Xeon™ or Itanium® family manufactured by Intel™, the Turion™, Athlon™, Sempron™, Opteron™ FX™, Phenom™ family manufactured by AMD™, or any of various processors manufactured by Sun Microsystems. The image processor 921 may also include graphical processing units such as a GPU from the GeForce®, Quadro®, Tesla® family manufactured by Nvidia™, GMA, Iris™ family manufactured by Intel™, or the Radeon™ family manufactured by AMD™. The image processor 921 may also include accelerated processing units such as the Desktop A-4 (6, 8) Series manufactured by AMD™, the Xeon Phi™ family manufactured by Intel™. The disclosed embodiments are not limited to any type of processor(s) or processor circuits otherwise configured to meet the computing demands of identifying, analyzing, maintaining, generating, and/or providing large amounts of imaging data or manipulating such imaging data to detect target object patches from a 3D image, provide physiological condition prediction on target object level and/or on image level, or to manipulate any other type of data consistent with the disclosed embodiments. In addition, the term "processor" or "image processor" may include more than one processor, for example, a multi-core design or a plurality of processors each having a multi-core design. The image processor 921 can execute sequences of computer program instructions, stored in memory 922, to perform various operations, processes, methods disclosed herein.

The image processor 921 may be communicatively coupled to the memory 922 and configured to execute computer-executable instructions stored therein. The memory 922 may include a read only memory (ROM), a flash memory, random access memory (RAM), a dynamic random-access memory (DRAM) such as synchronous DRAM (SDRAM) or Rambus DRAM, a static memory (e.g., flash memory, static random access memory), etc., on which computer executable instructions are stored in any format. In some embodiments, the memory 922 may store computer-executable instructions of one or more image processing program(s) 923. The computer program instructions can be accessed by the image processor 921, read from the ROM, or any other suitable memory location, and loaded in the RAM for execution by the image processor 921. For example, memory 922 may store one or more software applications. Software applications stored in the memory 922 may include, for example, an operating system (not shown) for common computer systems as well as for soft-controlled devices. Further, memory 922 may store an entire software application or only a part of a software application (e.g. the image processing program (s) 923) to be executable by the image processor 921. In addition, the memory 922 may store a plurality of software modules, for implementing the respective steps of the method for automatically predicting the physiological condition (target object level and/or image level) of the patient from a 3D image or the process for training the 3D learning network consistent with the present disclosure. For example, the nodule malignancy prediction model training unit 202, the nodule malignancy prediction unit 204, and the nodule detection system 100 as shown in FIG. 2 may be implemented as soft modules stored on the memory 922. For another example, at least the nodule malignancy prediction unit 204 is implemented as a soft module stored on the memory 922, each of the nodule malignancy prediction model training unit 202 and the nodule detection system 100 may be located remote from the medical image processing device 900 and communicate with the nodule malignancy prediction unit 204 to enable it receive trained nodule malignancy prediction model and the detected nodule patches for predict the malignancy level of individual nodule patches.

Besides, the memory 922 may store data generated/buffered when a computer program is executed, for example, medical image data 924, including the medical images transmitted from image acquisition device(s), medical image database 925, image data storage device 926, etc. Such medical image data 924 may include the received 3D medical image(s) for which the automatic detection of target object and target object patch and further physiological level prediction is to be implemented. Besides, the medical image data 924 may also include the 3D medical image(s) together with the physiological level prediction results for the same. The image processor 921 may execute the image processing program(s) 923 to implement a method for automatically predicting physiological condition from a 3D image. In some embodiments, when executing the image processing program 923, the image processor 921 may associate the corresponding 3D images with the prediction results, including the target object level physiological condition and/or the image level physiological condition, and transmit the 3D images together with (such as marked with) the prediction results into the storage 922 so as to maintain the same as the medical image data 924. Optionally, the memory 922 may communicate with the medical image database 925 to obtain images (with target object(s) therein) therefrom or to transmit the 3D images together with the detected target object patches to the medical image database 925. In this way, the detected target object patches may be stored on the medical image database 925 to be accessed, obtained, and utilized by other medical image processing devices, if needed.

In some embodiments, the nodule malignancy prediction model and the cancer prediction model (for example, the respect 3D learning networks used as the two prediction models) may be stored in the memory 922. Optionally, the 3D learning network may be stored in a remote device, a separate database, such as the medical image database 925, distributed devices, and may be used by the image processing program(s) 923. The 3D images (or the target object patches) together with the corresponding prediction results may be stored as new training samples in the medical image database 925.

In some embodiment, the image data storage device 926 may be provided to exchange image data with the medical image database 925. For example, the image data storage device 926 may reside in other medical image acquisition devices.

The input/output 927 may be configured to allow the medical image processing device 900 to receive and/or send data. The input/output 927 may include one or more digital and/or analog communication devices that allow the device 900 to communicate with a user or other machine and device. For example, the input/output 927 may include a keyboard and a mouse that allow the user to provide an input.

The network interface 928 may include a network adapter, a cable connector, a serial connector, a USB connector, a parallel connector, a high-speed data transmission adapter such as optical fiber, USB 9.0, lightning, a wireless network adapter such as a Wi-Fi adapter, a telecommunication (9G, 4G/LTE, etc.) adapters. The device 900 may be connected to the network through the network interface 928. The network may provide the functionality of local area network (LAN), a wireless network, a cloud computing environment (e.g., software as a service, platform as a service, infrastructure as a service, etc.), a client-server, a wide area network (WAN), and the like.

Besides displaying the medical images, the image display 929 may also display other information, such as the detected nodules and the prediction result. For example, the image display 929 may be an LCD, a CRT, or an LED display.

Various operations or functions are described herein, which may be implemented as software code or instructions or defined as software code or instructions. Such content may be source code or differential code ("delta" or "patch" code) that can be executed directly ("object" or "executable" form). The software code or instructions may be stored in computer readable storage medium, and when executed, may cause a machine to perform the described functions or operations and include any mechanism for storing information in the form accessible by a machine (e.g., computing device, electronic system, etc.), such as recordable or non-recordable media (e.g., read-only memory (ROM), random access memory (RAM), disk storage media, optical storage media, flash memory devices, etc.).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, an apparatus, system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Exemplary Methods described herein can be machine or computer-implemented at least in part. Some examples can include a computer-readable medium or machine-readable medium encoded with instructions operable to configure an electronic device to perform methods as described in the above examples. An implementation of such methods can include software code, such as microcode, assembly language code, a higher-level language code, or the like. The various programs or program modules can be created using a variety of software programming techniques. For example, program sections or program modules can be designed in or by means of Java, Python, C, C++, assembly language, or any known programming languages. One or more of such software sections or modules can be integrated into a computer system and/or computer-readable media. Such software code can include computer readable instructions for performing various methods. The software code may form portions of computer program products or computer program modules. Further, in an example, the software code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the descriptions be considered as examples only, with a true scope being indicated by the following claims and their full scope of equivalents.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computer-implemented method for automatically detecting a physiological condition from a medical image of a patient, comprising:
   receiving the medical image acquired by an imaging device;
   detecting, by a processor, target objects and obtaining the corresponding target object patches from the received medical image; and
   determining, by the processor, a first parameter using a first learning network for each target object patch, the first parameter represents a physiological condition level of the corresponding target object, and the first learning network is trained by adding one or more auxiliary classification layers, wherein the first learning network, with the added one or more auxiliary classification layers, is trained to conjunctively perform at least one auxiliary classification task and a task of determination of the physiological condition level of the corresponding target object, wherein the physiological condition level comprises a malignancy level and parameters in a classification portion of the first learning network correspond to a number of possible scores of the malignancy level, and wherein the first learning network, with the added one or more auxiliary classification layers, is trained using a cross-entropy loss function that weighs a loss between the task of determination of the malignancy level and auxiliary classification tasks.

2. The computer-implemented method of claim 1; further comprising:
determining, by the processor, a second parameter on the basis of the determined first parameters of multiple target objects in the medical image, wherein the second parameter represents physiological condition level of the medical image.

3. The computer-implemented method of claim 1; wherein the physiological condition level of the target object is the malignancy level of the target object, the physiological condition level of the medical image is whether the patient will develop a cancer and/or whether the patient has developed a cancer in the organ where the target object locates.

4. The computer-implemented method of claim 3, wherein the target object is a lung nodule.

5. The computer-implemented method of claim 1, wherein the one or more auxiliary classification layers added for training is removed so as to obtain the trained first learning network for determining the first parameter for the target object patch.

6. The computer-implemented method of claim 1, wherein the first learning network is trained by using cross-entropy as a loss function.

7. The computer-implemented method of claim 6, wherein the at least one auxiliary classification task includes at least one of texture classification, size classification, solidarity classification, lobulation classification, and speculation classification.

8. The computer-implemented method of claim 1, wherein the first earning network is constructed on the basis of a convolution neural network.

9. The computer-implemented method of claim 1, further comprising:
determining a second parameter, by the processor, using a second learning network on the basis of multiple target object patches from the medical image, wherein the second parameter represents physiological condition level of the patient, and the second learning network is configured to perform multiple-instance learning by reutilizing the trained first learning network for each of the multiple target object patches so as to extract respect target object features as instance features.

10. The computer-implemented method of claim 9, wherein the multiple target object patches are determined based on target object detection confidence.

11. The computer-implemented method of claim 10, wherein the step of determining a second parameter using a second learning network on the basis of multiple target object patches from the medical image includes:
pooling the extracted target object features into a lower dimension; and
feeding the pooled features into a classifier, so as to determine the second parameter.

12. The computer-implemented method of claim 11, wherein the second learning network is configured to reutilize the trained first learning network by feeding each of the multiple target object patches into the trained first learning network to obtain the corresponding target object feature.

13. The computer-implemented method of claim 12, wherein the first learning network includes multiple convolution blocks and multiple fully connected layers, and the output of a fully connected layer of the trained first learning network being applied to one of the multiple target object patches is used as the corresponding target object feature.

14. The computer-implemented method of claim 11, wherein the classifier is a multiple layer perceptron and the second learning network is configured to reutilize the trained first learning network by using weights of the trained first learning network as initial weights of pass of the second learning network for each target object patch, which shares the same weight.

15. The computer-implemented method of claim 11, wherein the pooling includes any one of average, max pooling, and bag of feature word pooling.

16. The computer-implemented method of claim 11, wherein the second learning network is configured to perform multiple-instance learning by reutilizing the trained first learning network with the one or more auxiliary classification layers for each of the multiple target object patches so as to extract respect target object features.

17. The computer-implemented method of claim 16, wherein the extracted target object features of each of the multiple target object patches are concatenated with each other before pooling.

18. The computer-implemented method of claim 11, wherein a number of the multiple target object patches is predefined, if the number of the target object patches detected from the medical image is less than the predefined number, the remaining number of the target object patches is randomly sampled from the medical image.

19. A system for automatically detecting a physiological condition from a medical image of a patient, comprising:
an interface configured to receive the medical image acquired by an imaging device; and
a processor configured to:
detect target objects and obtaining the corresponding target object patches from the received medical image; and
determine a first parameter using a first learning network for each target object patch, the first parameter represents the physiological condition level of the corresponding target object, and the first learning network is trained by adding one or more auxiliary classification layers; wherein the first learning network; with the added one or more auxiliary classification layers, is trained to conjunctively perform at least one auxiliary classification task and a task of determination of the physiological condition level of the corresponding target object, wherein the physiological condition level comprises a malignancy level and parameters in a classification portion of the first learning network correspond to a number of possible scores of the malignancy level, and wherein the first learning network, with the added one or more auxiliary classification layers; is trained using a cross-entropy loss function that weighs a loss between the task of determination of the malignancy level and auxiliary classification tasks.

20. The system of claim 19, wherein, e processor is further configured to:
determine a second parameter using a second learning network on the basis of multiple target object patches from the medical image, wherein the second parameter represents physiological condition level of the patient, and the second learning network is configured to perform multiple-instance learning by reutilizing the trained first learning network for each of the multiple target object patches so as to extract respect target object features as instance features.

21. A non-transitory computer readable medium having instructions stored thereon, the instructions, when executed by a processor, perform a method for automatically detecting a physiological condition from a medical image of a patient, the method comprising:
    detecting target objects and obtaining the corresponding target object patches from the medical image; and
    determining a first parameter using a first learning network for each target object patch, the first parameter represents the physiological condition level of the corresponding target object, and the first learning network is trained by adding one or more auxiliary classification layers,
    wherein the first learning network, with the added one or more auxiliary classification layers, is trained to conjunctively perform at least one auxiliary classification task and a task of determination of the physiological condition level of the corresponding target object, wherein the physiological condition level comprises a malignancy level and parameters in a classification portion of the first learning network correspond to a number of possible scores of the malignancy level, and wherein the first learning network, with the added one or more auxiliary classification layers, is trained using a cross-entropy loss function that weighs loss between the task of determination of the malignancy level and auxiliary classification tasks.

22. The non-transitory computer readable medium of claim 21, wherein the method further comprising:
    determining a second parameter using a second learning network on the basis of multiple target object patches from the medical image, wherein the second parameter represents physiological condition level of the patient, and the second learning network is configured to perform multiple-instance learning by reutilizing the trained first learning network for each of the multiple target object patches so as to extract respect target object features as instance features.

* * * * *